(12) United States Patent
Lee et al.

(10) Patent No.: US 7,187,520 B2
(45) Date of Patent: Mar. 6, 2007

(54) MAGNETIC HEAD HAVING THERMALLY ASSISTED RECORDING DEVICE, AND METHOD OF FABRICATION THEREOF

(75) Inventors: Edward Hin Pong Lee, San Jose, CA (US); Jeffrey S. Lille, Sunnyvale, CA (US); Vladimir Nikitin, Campbell, CA (US); Hugo Alberto Emilio Santini, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 330 days.

(21) Appl. No.: 10/791,186

(22) Filed: Mar. 1, 2004

(65) Prior Publication Data

US 2005/0190494 A1    Sep. 1, 2005

(51) Int. Cl.
G11B 5/147    (2006.01)

(52) U.S. Cl. .............. 360/126; 360/125; 360/128

(58) Field of Classification Search .......... 360/126, 360/128
See application file for complete search history.

(56) References Cited

U.S. PATENT DOCUMENTS

| | | | |
|---|---|---|---|
| 6,069,853 A | 5/2000 | Novotny et al. | 369/13 |
| 6,831,802 B1 * | 12/2004 | Gillis et al. | 360/75 |
| 6,909,674 B2 * | 6/2005 | Ju et al. | 369/13.17 |
| 6,940,693 B2 * | 9/2005 | Lille et al. | 360/126 |
| 6,956,716 B2 * | 10/2005 | Lille | 360/126 |
| 6,999,277 B2 * | 2/2006 | Fontana et al. | 360/126 |
| 7,009,818 B1 * | 3/2006 | Arnold et al. | 360/320 |
| 7,035,047 B2 * | 4/2006 | Hsiao et al. | 360/126 |
| 7,042,810 B2 * | 5/2006 | Akiyama et al. | 369/13.33 |
| 7,113,369 B2 * | 9/2006 | Ota et al. | 360/234.5 |
| 2001/0013997 A1 * | 8/2001 | Sasaki et al. | 360/317 |
| 2004/0019638 A1 * | 1/2004 | Makagon et al. | 709/204 |
| 2004/0240109 A1 * | 12/2004 | Hamann et al. | 360/126 |
| 2005/0018348 A1 * | 1/2005 | Lille et al. | 360/128 |

FOREIGN PATENT DOCUMENTS

JP    2005050511 A  *  2/2005

OTHER PUBLICATIONS

IBM TDB v39 n7 Jul. 1996 p. 237-238.
IBM Dossier# ARC920000094.

* cited by examiner

Primary Examiner—William Korzuch
Assistant Examiner—Matthew G. Kayrish
(74) Attorney, Agent, or Firm—Robert O. Guillot; Intellectual Property Law Offices

(57) ABSTRACT

A magnetic head including a media heating device that is fabricated within the magnetic head structure. The media heating device includes an electrically resistive element that is fabricated above the first magnetic pole layer close to the ABS surface of the head. A P1 pole pedestal is fabricated above the heating element. Electrical insulation layers are fabricated beneath and above the heating element to prevent electrical shorting to the P1 pole layer and the P1 pole pedestal that are disposed beneath and above the heating element, respectively.

16 Claims, 9 Drawing Sheets

MAGNETIC HEAD HAVING THERMALLY ASSISTED RECORDING DEVICE, AND METHOD OF FABRICATION THEREOF

BACKGROUND OF THE INVENTION

1. Field of the Invention

The present invention relates generally to magnetic heads that are utilized with thin film hard disk data storage devices, and more particularly to the design and fabrication of a magnetic head having a storage media heating device formed adjacent to a first magnetic pole of the write head components of the magnetic heads.

2. Description of the Prior Art

As is well known to those skilled in the art, standard magnetic heads include write head elements that include two magnetic poles, commonly termed the P1 and P2 poles, with a write gap layer formed between them. During a data recording procedure, the passage of magnetic flux across the write gap between the two poles creates a magnetic field which influences a thin film layer of magnetic media on a hard disk that is located proximate the magnetic head, such that the changing magnetic flux creates data bits within the magnetic media.

The continual quest for higher data recording densities of the magnetic media demands smaller bit cells, in which the volume of recording material (grains) in the cells is decreased and/or the coercivity (Hc) is increased. When the bit cell size is sufficiently reduced, the problem of the superparamagnetic limit will provide a physical limit of the magnetic recording areal density. Present methods to delay the onset of this limit in storage media include fabricating smaller magnetic grains that are decoupled from each other and which have very high coercivity. Additionally, write head technology methods include the use of higher magnetic moment materials, and using thermally assisted recording heads. The present invention relates to such thermally assisted recording heads in which a heating device is disposed within the magnetic head. Heat from the magnetic head temporarily reduces the localized coercivity of the media, such that the magnetic head is able to record data bits within the magnetic media. Once the disk returns to ambient temperature, the very high coercivity of the magnetic media provides the bit latency necessary for the recorded data disk.

SUMMARY OF THE INVENTION

A magnetic head of the present invention includes a media heating device that is fabricated within the magnetic head structure following the fabrication of the read head element of the magnetic head. The media heating device serves to heat the magnetic media immediately prior to the passage of the magnetic media beneath the write gap of the magnetic head. The heating of the media lowers its localized coercivity, which facilitates the writing of data to the media by the write head element of the magnetic head.

In a preferred embodiment, the magnetic head is formed as a piggyback magnetic head in which the second magnetic shield layer is separated from the first magnetic pole layer. The media heating device is fabricated above the first magnetic pole layer close to the ABS surface of the head. Following the fabrication of the heating device, a P1 pole pedestal is fabricated above the heating device. Write head induction coils, a write gap layer and a second magnetic pole are also fabricated to complete the fabrication of the write head portion of the magnetic head. In the preferred embodiment, the heating device includes an electrically resistive heating element and electrical leads, and electrical insulation layers are fabricated beneath and above the heating device to prevent electrical shorting to the P1 pole layer and the P1 pole pedestal that are disposed beneath and above the heating device, respectively. The heating element is preferably comprised of NiCr or NiFe, and the insulation layers are preferably comprised of alumina, such that only commonly utilized inductive head materials are introduced into the magnetic head in fabricating the heating device. The electrical insulation layer that is fabricated beneath the heating device is preferably thicker than the electrical insulation layer that is fabricated above the heating device, such that heat from the heating element is preferentially conducted towards the P1 pole pedestal and away from the read head element.

It is an advantage of the magnetic head of the present invention that it includes a media heating device to facilitate the writing of data to a magnetic disk.

It is another advantage of the magnetic head of the present invention that the heating device is disposed beneath a write gap layer of the magnetic head, such that the media is heated by the heating element prior to its passage below the write gap of the magnetic head.

It is a further advantage of the magnetic head of the present invention that the heating device is disposed beneath a P1 pole pedestal of the magnetic head, such that the P1 pole pedestal can absorb heat from the heating element and radiate the heat to the media passing beneath the P1 pole pedestal.

It is an advantage of the hard disk drive of the present invention that it includes a magnetic head having a media heating device, whereby higher data areal storage densities of the hard disk drive can be obtained.

It is another advantage of the hard disk drive of the present invention that it includes a magnetic head having a media heating device, whereby data storage disks having a higher coercivity can be written upon.

It is a further advantage of the hard disk drive of the present invention that it includes a magnetic head that includes a media heating device to facilitate the writing of data to a magnetic disk.

It is yet another advantage of the hard disk drive of the present invention that it includes a magnetic head having a heating device that is disposed beneath a write gap layer of the magnetic head, such that the media is heated by the heating device prior to its passage beneath the write gap of the magnetic head.

It is a further advantage of the hard disk drive of the present invention that it includes a magnetic head having a heating device that is disposed beneath a P1 pole pedestal of the magnetic head, such that the P1 pole pedestal can absorb heat from the heating device and radiate the heat to the media passing beneath the P1 pole pedestal.

These and other features and advantages of the present invention will no doubt become apparent to those skilled in the art upon reviewing the following detailed description which makes reference to the several figures of the drawings.

IN THE DRAWINGS

The following drawings are not made to scale of an actual device, and are provided for illustration of the invention described herein.

DETAILED DESCRIPTION OF THE PREFERRED EMBODIMENTS

Figure 1:
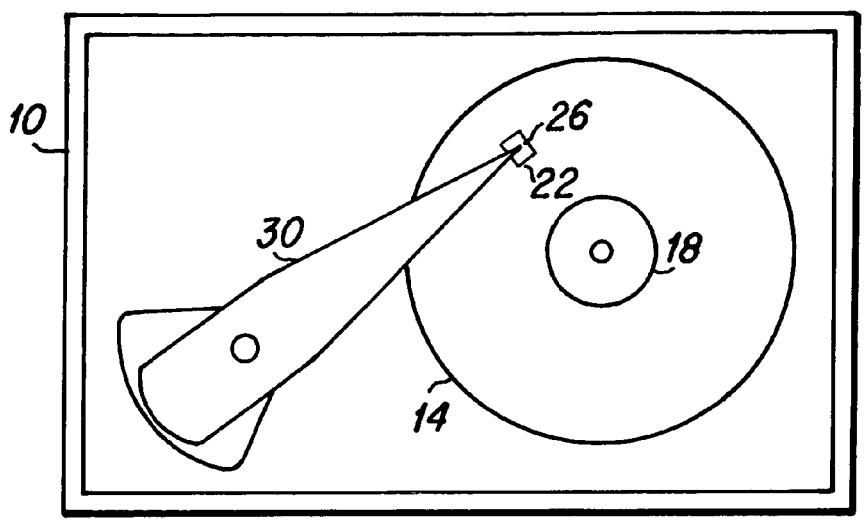
FIG. 1 is a schematic top plan view of a hard disk drive including the magnetic head of the present invention.

Efforts to increase areal data storage density of hard disk drives have lead to improvements in the structure and function of the write head elements of magnetic heads. A simplified top plan view of a typical hard disk drive 10 which is suitable to include the magnetic head of the present invention is presented in FIG. 1. As depicted therein, at least one hard disk 14 is rotatably mounted upon a motorized spindle 18. A slider 22, having a magnetic head 26 disposed thereon, is mounted upon an actuator arm 30 to fly above the surface of each rotating hard disk 14, as is well known to those skilled in the art. The present invention includes improved features and manufacturing methods for such magnetic heads 26, and to better described the present invention a prior art magnetic head is next described.

Figure 2:
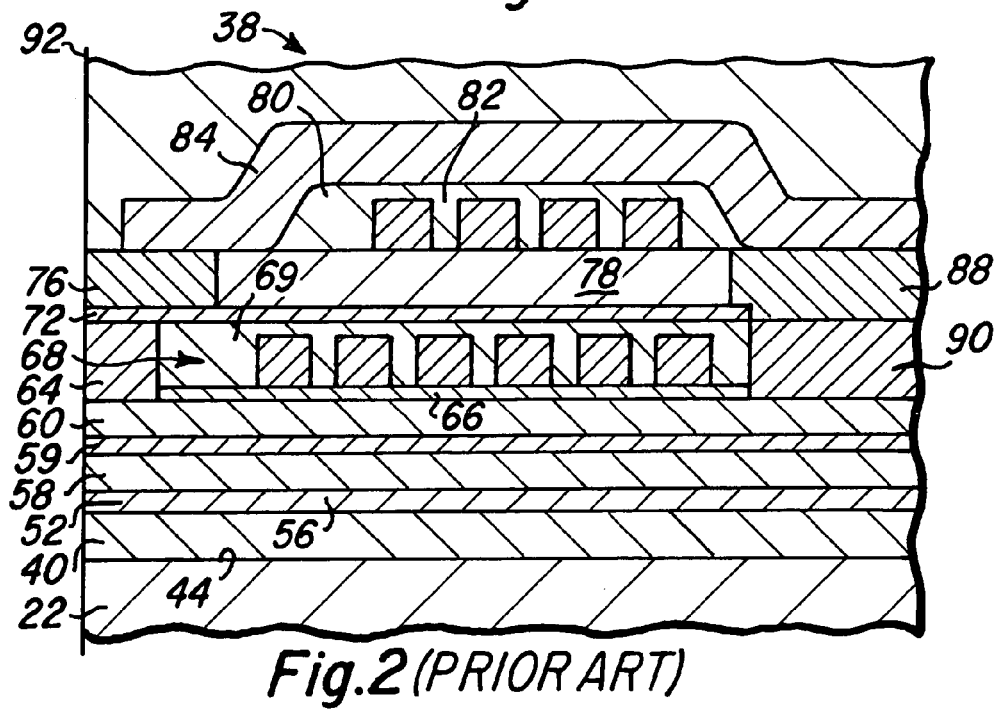
FIG. 2 is a side cross-sectional view depicting various components of a prior art magnetic head.

As will be understood by those skilled in the art, FIG. 2 is a side cross sectional view depicting portions of a prior art magnetic head 38. The magnetic head 38 includes a first magnetic shield layer (S1) 40 that is formed upon a surface 44 of the slider body material 22. A read head sensor element 52 is disposed within insulating layers 56 and a second magnetic shield layer (S2) 58 is formed upon the insulation layers 56. An electrical insulation layer 59 is then deposited upon the S2 shield 58, and a first magnetic pole (P1) 60 is fabricated upon the insulation layer 59.

Following the fabrication of the P1 layer 60, a Pi pole pedestal 64 is fabricated upon the P1 layer 60, an insulation layer 66 is deposited, and a first induction coil layer 68 can then be fabricated within insulation 69 above the P1 layer 60, within the layer that includes the P1 pole pedestal 64. Thereafter, a write gap layer 72 is deposited, followed by the fabrication of a P2 magnetic pole tip 76 within an insulation layer 78. A second induction coil layer 80 may then be fabricated within insulation 82 above the layer containing the P2 pole tip 76. Thereafter, a yoke portion 84 of the second magnetic pole is fabricated in magnetic connection with the P2 pole tip 76, and through back gap elements 88 and 90 to the P1 layer 60. The head is subsequently fabricated such that an air bearing surface (ABS) 92 is created. It is to be understood that there are many detailed features and fabrication steps of the magnetic head 38 that are well known to those skilled in the art, and which are not deemed necessary to describe herein in order to provide a full understanding of the present invention.

As has been indicated hereabove, the present invention is a magnetic head including a heating device that provides thermal assistance in recording data bits to high coercivity magnetic media. As will be understood from the following detailed description, the magnetic head of the present invention includes an electrically resistive heating element that is fabricated beneath the P1 pole pedestal 64 and above the P1 pole layer 60. The fabrication of the magnetic head 26 of the present invention is next described.

Figure 3:
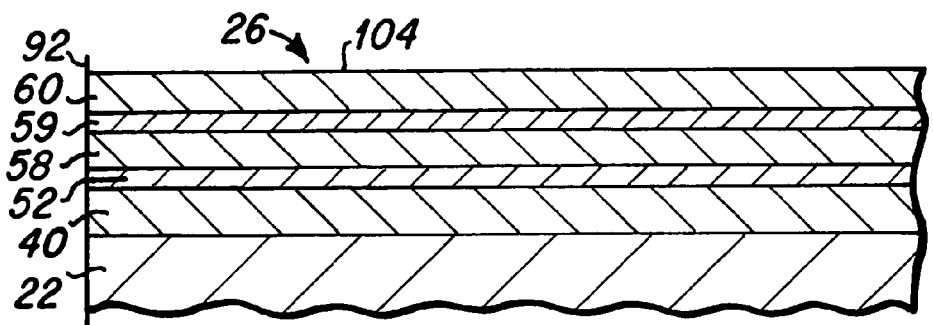
FIGS. 3–8 are side cross-sectional views depicting successive process steps for fabricating a magnetic head of the present invention.

FIG. 3 depicts a fabricated read head portion of the magnetic head 26. As with the prior art head depicted in FIG. 2, it includes a first magnetic shield layer 40, a read head sensor element 52 and a second magnetic shield layer 58. It is therefore to be understood that the magnetic head of the present invention makes no significant changes in the fabrication of the read head portion of the magnetic head. As is well known to those skilled in the art, in an alternative magnetic head design, termed a merged magnetic head, the S2 shield 58 also serves as a first magnetic pole, in which case the insulation layer 59 is not fabricated. The heater element of the present invention can be fabricated upon the shield/pole 58 of a merged magnetic head in the same manner as it is fabricated in the piggyback magnetic head design that is described in detail herein.

Figure 4:
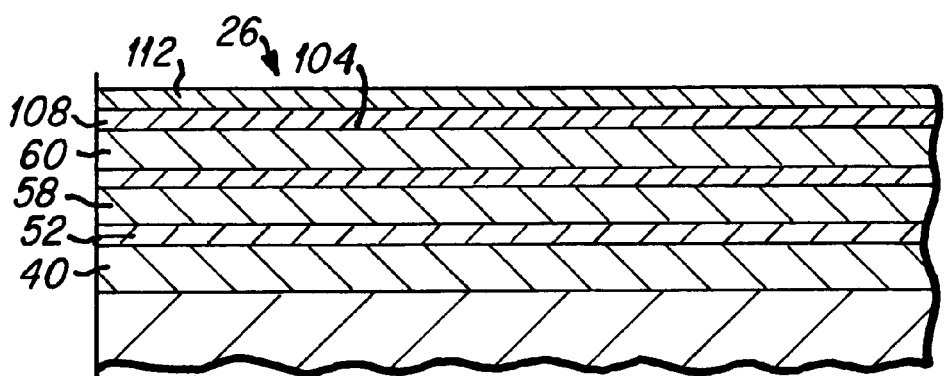

As depicted in FIG. 3, following the fabrication of the P1 layer 60, a chemical mechanical polishing (CMP) step is undertaken to obtain a smooth surface 104 upon which to fabricate further structures of the magnetic head. As depicted in FIG. 4, an alumina insulation layer 108 is next deposited upon the surface 104 of the P1 layer 60. The alumina insulation layer 108 provides electrical insulation of the heating device and leads described herebelow from the P1 layer 60. A thickness range for the alumina layer 108 is from approximately 100 Å to 2,000 Å, with a preferred thickness of approximately 1,000 Å. Following the deposition of the alumina insulation layer 108, a heating element material layer 112 is deposited across the wafer. The layer 112 is composed of a material such as NiCr or NiFe with a thickness of from 100 Å to 1,000 Å, and preferably approximately 400 Å. At this point, it is important to expose the alignment targets (not shown) of the wafer, which have been covered over by the full film deposited layers 108 and 1 12, in order to accurately align the various photolithographic masks of the fabrication process of the present invention, as will be well understood by those skilled in the art.

Figure 5:
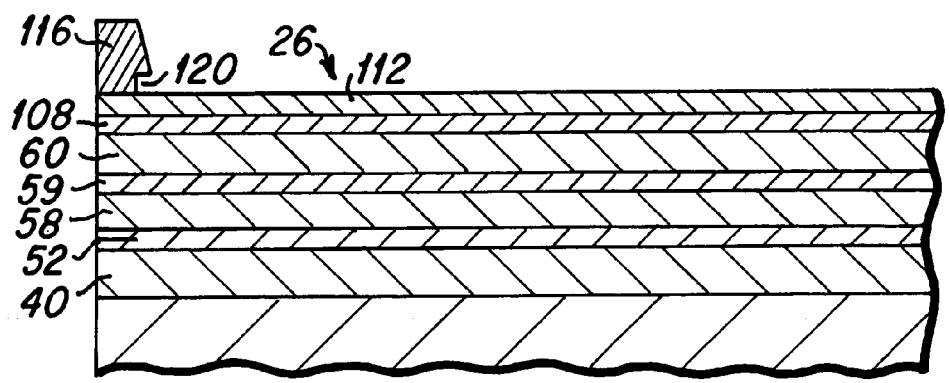
Figure 6:
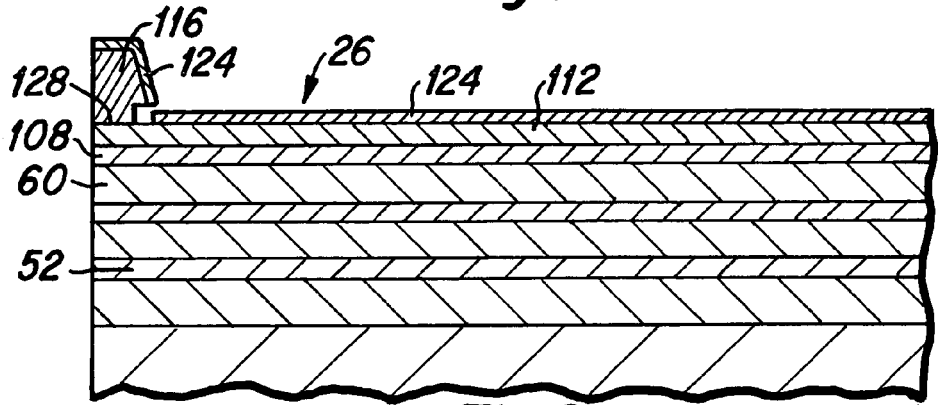

As is depicted in FIG. 5, a bilayer photoresist mask 1 16 with a liftoff undercut 120 (which may be termed the track width mask), is next fabricated upon a central portion of the heating element layer 112 above the MR element 52 in a location that will be beneath a P1 pedestal element that is subsequently fabricated. A typical bilayer resist may be 0.5 microns thick with a 0.1 micron undercut. Thereafter, as depicted in FIG. 6, electrical lead material 124 is deposited across the wafer on top of the heating element layer 112 and on top of the bilayer photoresist mask 116. It is therefore to be understood that the footprint of the bilayer photoresist 116 mask serves to protect a central portion 128 of the heating element layer 112 from the deposited electrical lead layer material 124. A preferred electrical lead layer is comprised of approximately 50 Å Ta, 300 Å Cu, 100 Å Ta. Tantalum is useful as an adhesion layer and a diffusion barrier. Other conductive metals such as ruthenium or gold may be used in place of the conductive copper, and the overall electrical lead thickness is preferably from 100 Å to 1,000 Å. The bilayer resist mask 116 can also be used as a milling mask to subtractively remove the heating element material, and then subsequently replace it with lead material. This will change the lead connection between the heating element layer and the lead; namely, from an arrangement of the lead being fabricated on top of the heating element layer to an abutted junction. As will further be obvious to those skilled in the art upon reading this detailed description, an alternative magnetic head design can be fabricated in which the electrical leads are first deposited, and the heating element layer is subsequently fabricated on top of the electrical leads.

Figure 7:
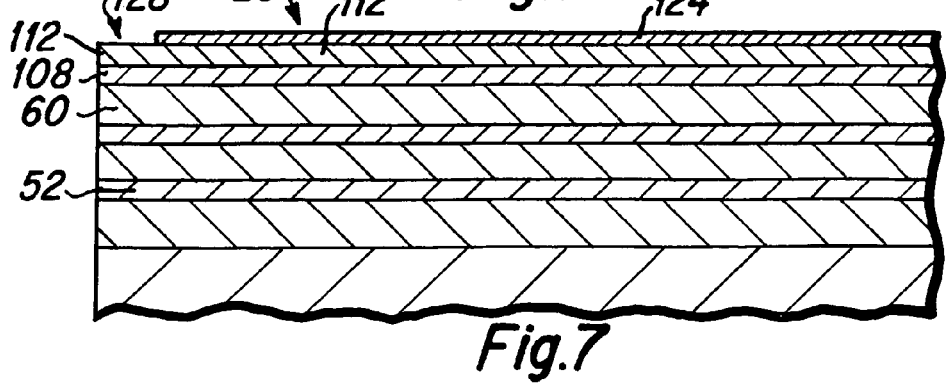
Figure 8:
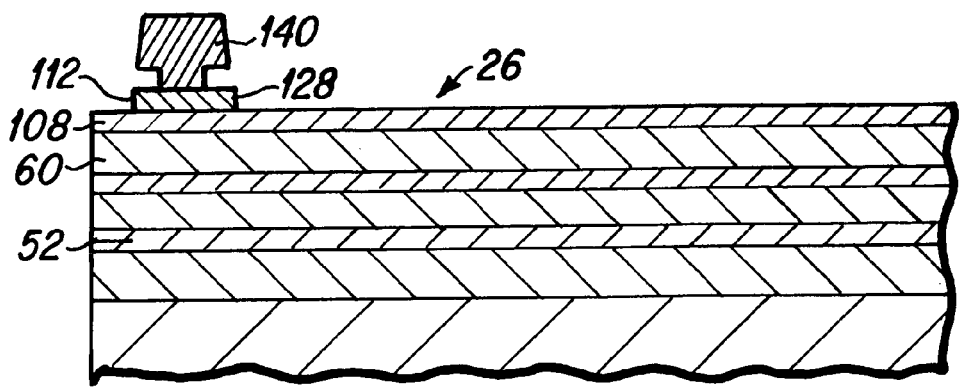

As is next depicted in FIG. 7, the bilayer photoresist mask 116 is removed, such that the protected central portion 128 of the heating element layer is exposed. Thereafter, as depicted in FIG. 8, a second bilayer photoresist mask 140 (which may be termed the stripe height mask) is fabricated at the location of the heating element. This second bilayer photoresist mask is formed with a larger footprint which covers both the central heating element 128 and portions 144 of the electrical lead layer 124 that extend outwardly to serve as contact pads for subsequent electrical connection of the lead layer and/or heater.

Figure 9:
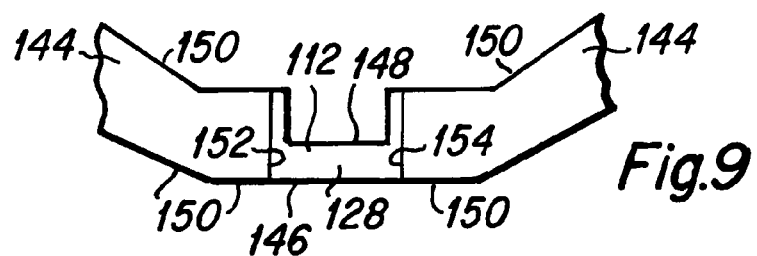
FIG. 9 is a top plan view depicting portions of the heating element and electrical lead layer of the present invention.

Referring to FIG. 8, an ion milling step is next undertaken to remove all of the electrical lead material 124 and heating element material layer 112 that is not covered by the bilayer photoresist 140. FIG. 9 is a top plan view of the central portion of the footprint of the bilayer photoresist 140, depicting the central heating element 128 and portions of the two electrical leads 144 that are deposited upon outer portions of the heating element layer. This subtractive process defines the front heater edge 146 and the back heater edge 148, and the edges 150 of the heater lead material 144 and the heating element material 112 beneath the lead material 144, as shown in FIG. 9. The two spaced apart electrical lead edges 152 and 154 are defined by the prior photoresist mask 116 that shields the central heating element 128 during the electrical lead material deposition step depicted in FIG. 6, and described hereabove. It is therefore to be understood that when electrical current is applied to the electrical leads 144 that the current will pass through the central heating element 128 to cause resistive heating of the central heating element 128. The track width of the central heating element 128 will generally be the distance between the two spaced part lead edges 152 and 154, which may be approximately 2 microns, and the stripe height of the heating element between the front and back edges 146 and 148 is approximately 0.5 microns. However, different heater dimensions can be constructed within the scope of the present invention. The resistance of the heating element 128 is determined by its sheet resistance and the thickness of the heating element layer 112.

Figure 10:
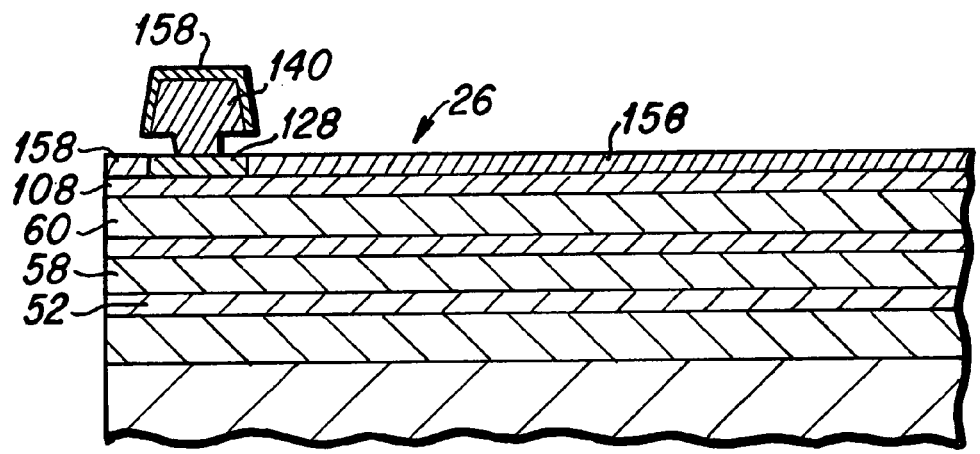
FIGS. 10–29 are side cross-sectional views depicting further successive process steps for fabricating the magnetic head of the present invention.
Figure 11:
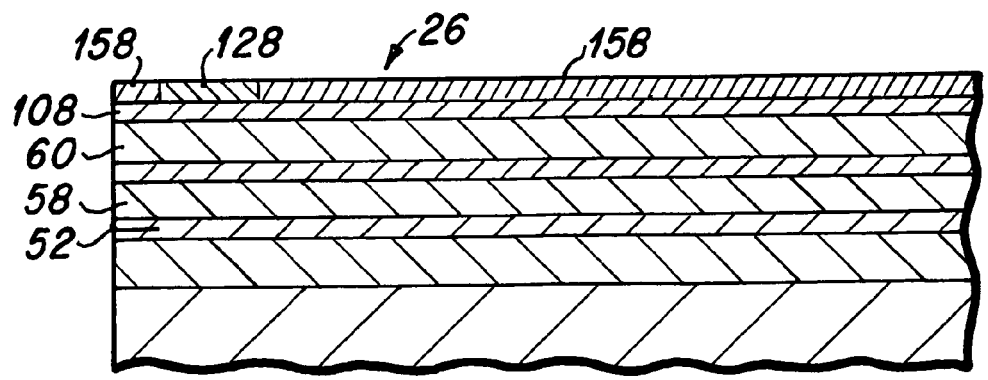
Figure 12:
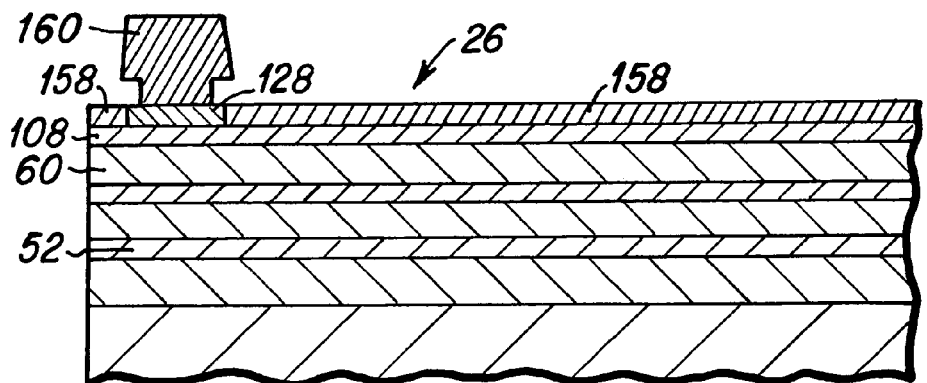
Figure 13:
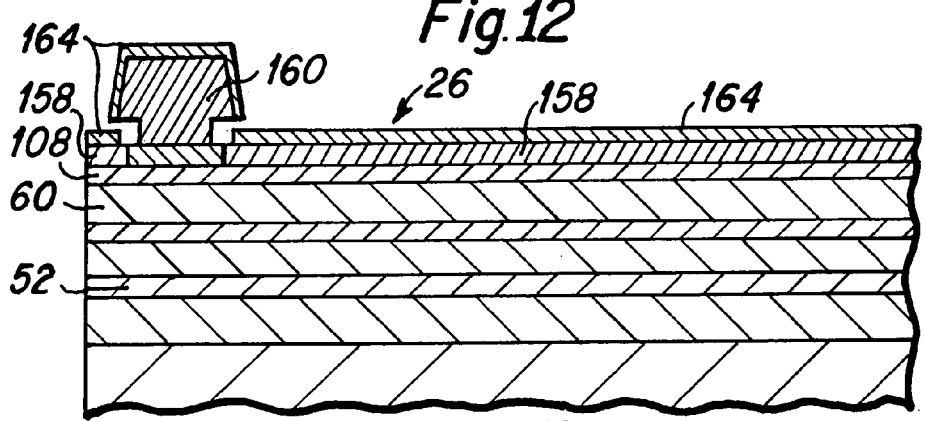

As depicted in FIG. 10, an alumina layer 158 is next deposited across the wafer, and the thickness of the alumina layer is approximately equal to the thickness of the remaining portions of the heating device that are covered by the bilayer photoresist 140. Thereafter, as depicted in FIG. 11, the bilayer photoresist 140 is removed, thus exposing the electrical leads 144 and central heating element 128 that were covered by the footprint of the bilayer photoresist 140. Thereafter, as depicted in FIG. 12, a further bilayer photoresist 160 is fabricated. The footprint of this bilayer photoresist 160 covers essentially just the heating element 128, leaving the outer portions of the electrical leads uncovered. Thereafter, as depicted in FIG. 13, a further alumina layer 164 is deposited over the wafer surface to provide protection for the leads during fabrication steps that follow. A desirable thickness for the alumina layer 164 is approximately 1,000 Å.

Figure 14:
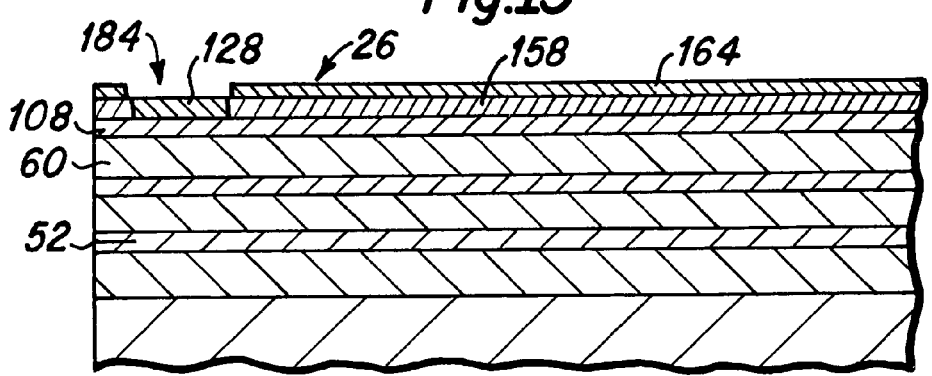
Figure 15:
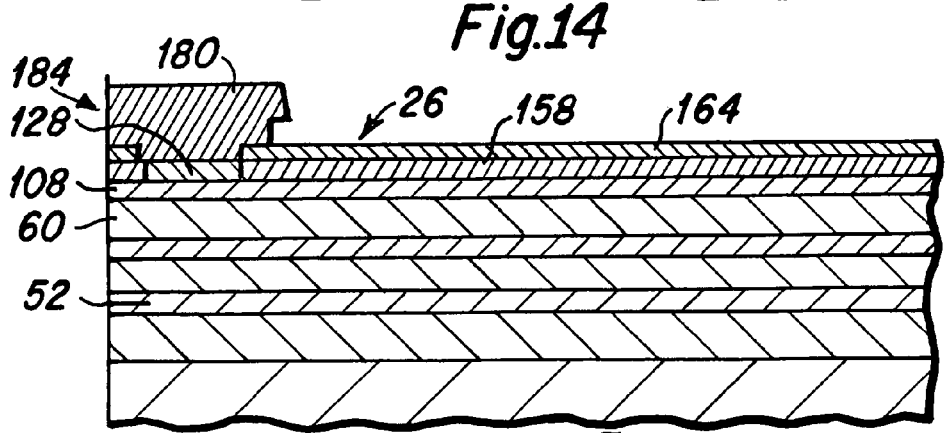

As is next depicted in FIG. 14, the bilayer liftoff photoresist 160 is removed following the deposition of the layer 164. Thereafter, as depicted in FIG. 15, a larger bilayer photoresist 180 is next fabricated on top of the heating element 128 and electrical leads 144 to protect them during the induction coil fabrication process that follows. At this point it is to be understood that the magnetic head heating device 184 of the present invention, including the central heating element 128 and leads 144, has essentially been fabricated, and that a P1 pedestal pole piece will subsequently be fabricated on top of the heating device 184. The detailed description that follows describes the fabrication of an induction coil structure, followed by the fabrication of the P1 pole pedestal. However, as will be understood by those skilled in the art, the fabrication process could alternatively be conducted by first fabricating the P1 pole pedestal and subsequently fabricating the induction coil structure at a later point in the head building process. Therefore, the detailed description that follows of first fabricating the induction coil structure and subsequently fabricating the P1 pole pedestal is not meant to omit coverage of this application for a process in which the P1 pole is first fabricated and an induction coil is subsequently fabricated. Indeed, because the thrust of the present invention is the fabrication of a heating device 184 beneath the P1 pole pedestal, the fabrication, or lack of fabrication, of an induction coil structure in the layer that includes the P1 pole pedestal, is not a central feature of the present invention.

Figure 16:
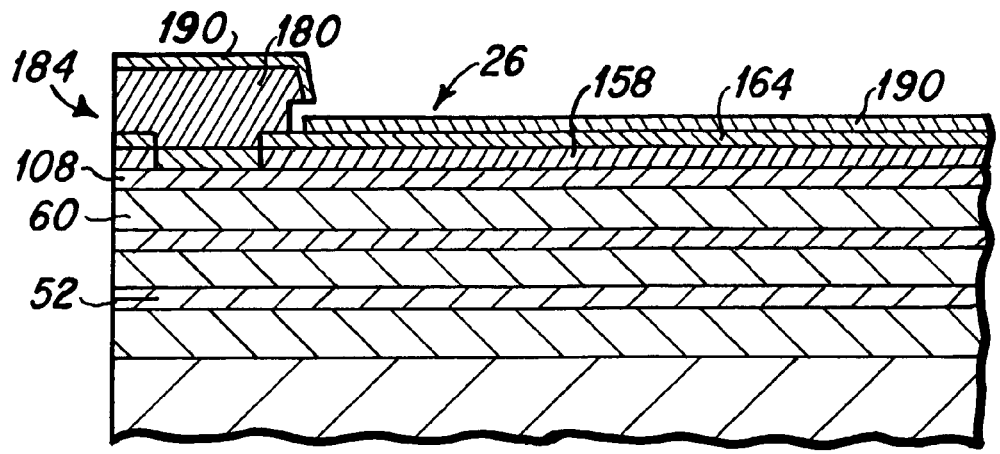
Figure 17:
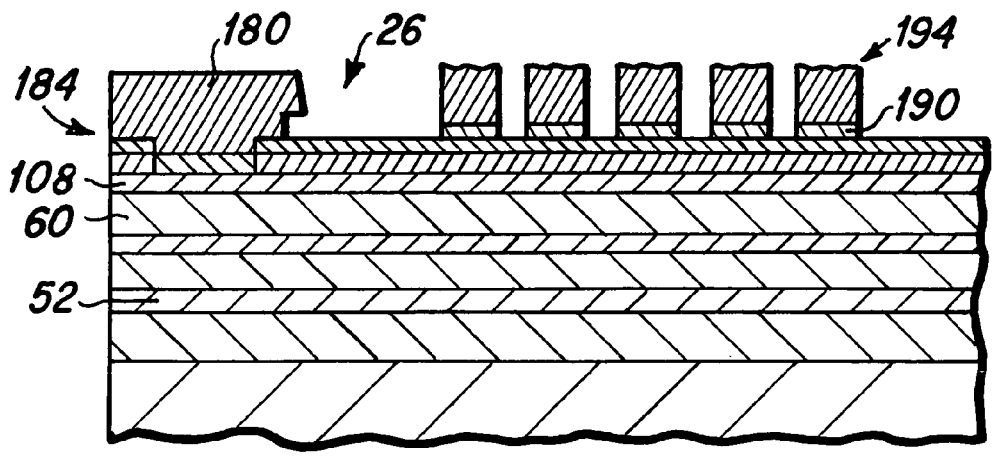

Returning now to FIG. 15, the bilayer photoresist 180 has been fabricated over the heating device 184 to protect it. At this point, though not depicted, openings are formed in the alumina layer 164 at the outer electrical connection pads (not shown) of the electrical lead layer 144 in order to form electrical connections thereto. As is next depicted in FIG. 16, a seed layer 190 for electroplating the copper induction coil and copper connectors for electrical connection to the electrical lead layer is deposited except in the region of the heater as protected by the resist layer 180. Thereafter, as depicted in FIG. 17, using photolithographic techniques that are well known to those skilled in the art, a photoresist layer (not shown) having photolithographically formed induction coil trenches (not shown) and electrical lead vias (not shown) is fabricated. Thereafter, the copper induction coil 194 and connectors (not shown) are electroplated into the induction coil trench and vias formed in the photoresist layer (not shown). Thereafter, as depicted in FIG. 17, the photoresist layer (not shown) is removed and the seed layer 190 is then removed, such that the induction coil 194 and electrical connections (not shown) are formed. Ion milling or sputter etching is typically used to remove the seed layer 190.

Figure 18:
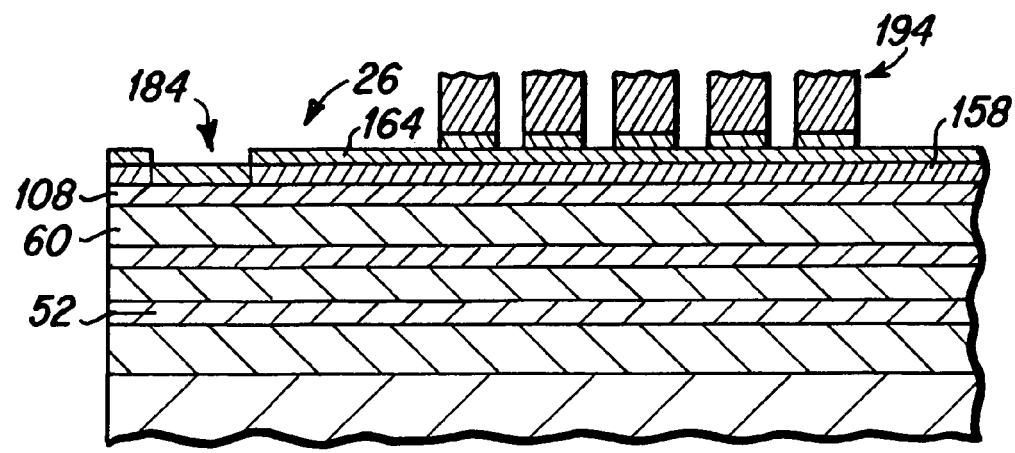
Figure 19:
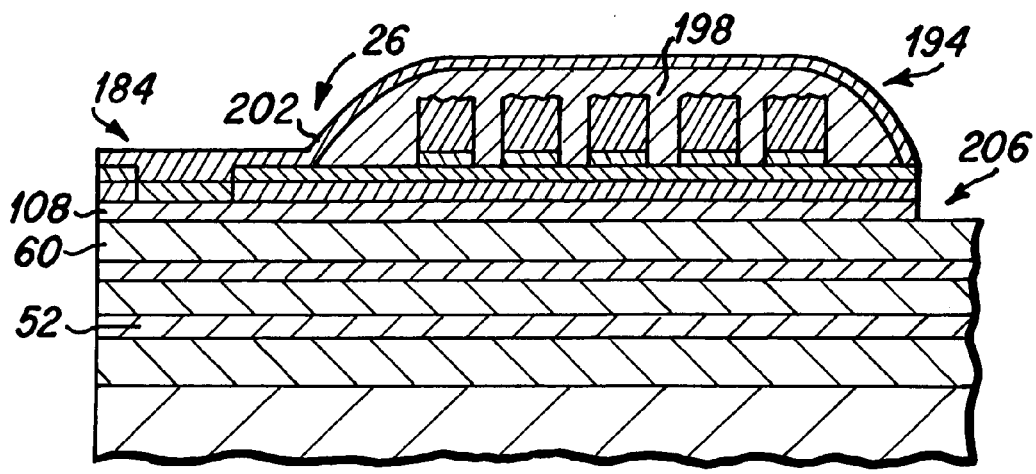
Figure 20:
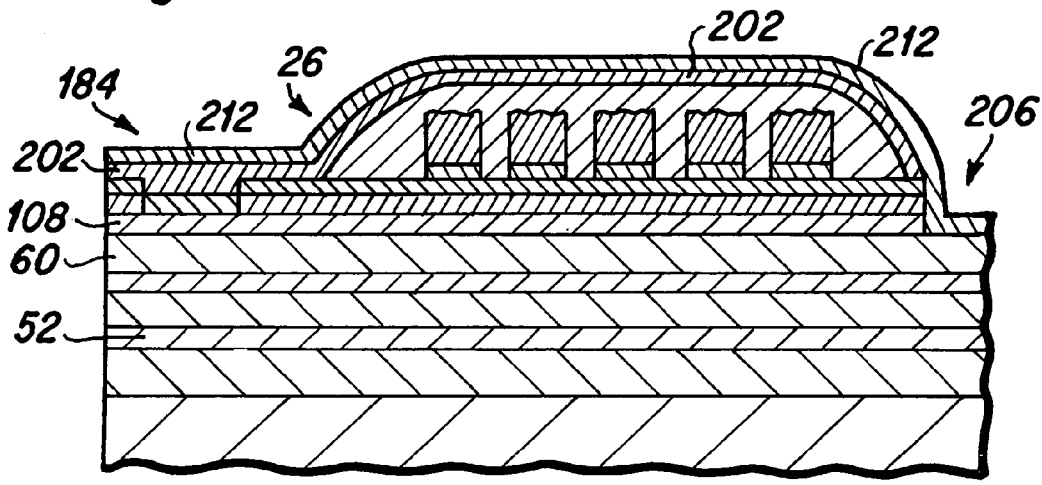
Figure 21:
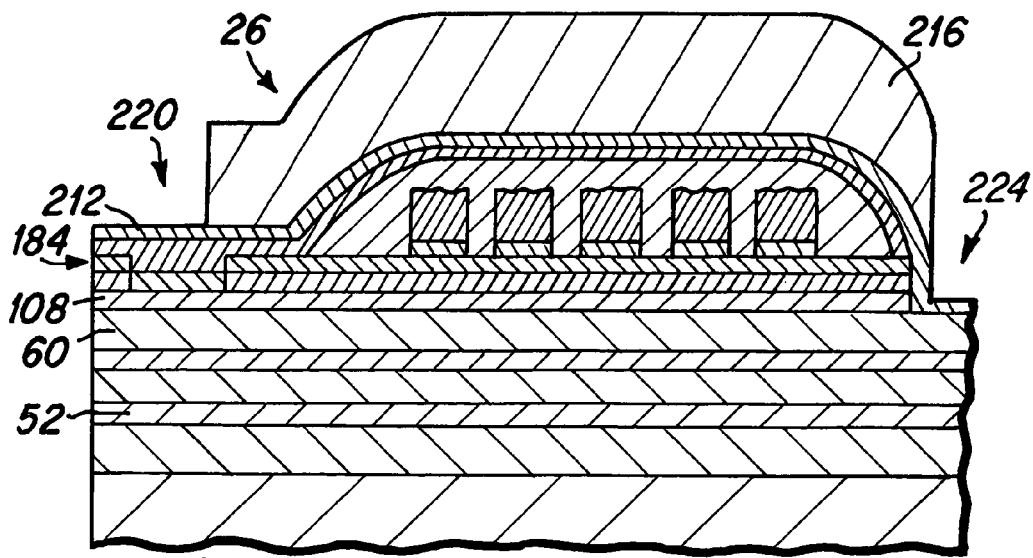
Figure 22:
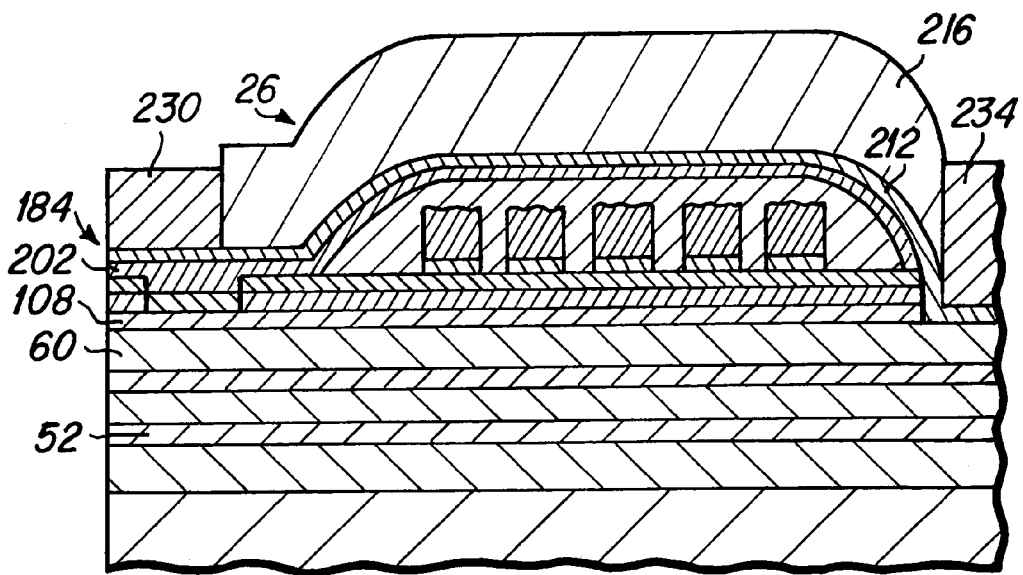

As is depicted in FIG. 18, the bilayer resist 180 that covered the heating device 184 is next removed. Thereafter, as depicted in FIG. 19, utilizing photolithographic techniques, the induction coil 194 is encapsulated in a hard bake resist 198 and an alumina layer 202 is then deposited across the surface of the wafer, covering the heating device 184 and the hard bake resist 198. A desired thickness of the alumina layer 202 on top of the heating device 184 is approximately 250 Å. This layer 202 will comprise the electrical isolation layer between the central heating element 128 of the heating device 184 and P1 pole pedestal that is subsequently fabricated, as is discussed herebelow. Thereafter, a portion of the alumina layer 202 at the location of the back gap 206 is etched down to the P1 pole layer 60 and other via connections (not shown) such as for the read head are also etched down. As is next depicted in FIG. 20, a P1 pole pedestal seed layer 212 is next deposited. The seed layer 212 is preferably comprised of NiFe. Thereafter, as depicted in FIG. 21, using photolithographic techniques, a resist layer 216 is fabricated to include a P1 pole pedestal opening 220 and a back gap opening 224. Thereafter, as depicted in FIG. 22, the P1 pole pedestal 230 and back gap 234 are plated up upon the seed layer 212. It is significant that the P1 pole pedestal 230 is plated up on top of the insulation layer 202 that covers the heating device 184. It is desirable that the alumina layer 108 below the heating device 184 be significantly thicker than the alumina layer 202 above the central heating element 128 of the heating device 184, because it is important that most of the thermal conductance from the heating element 128 go up to the P1 pedestal 230 and not down to the read head, because heat can have an adverse effect on the read head performance characteristics.

Figure 23:
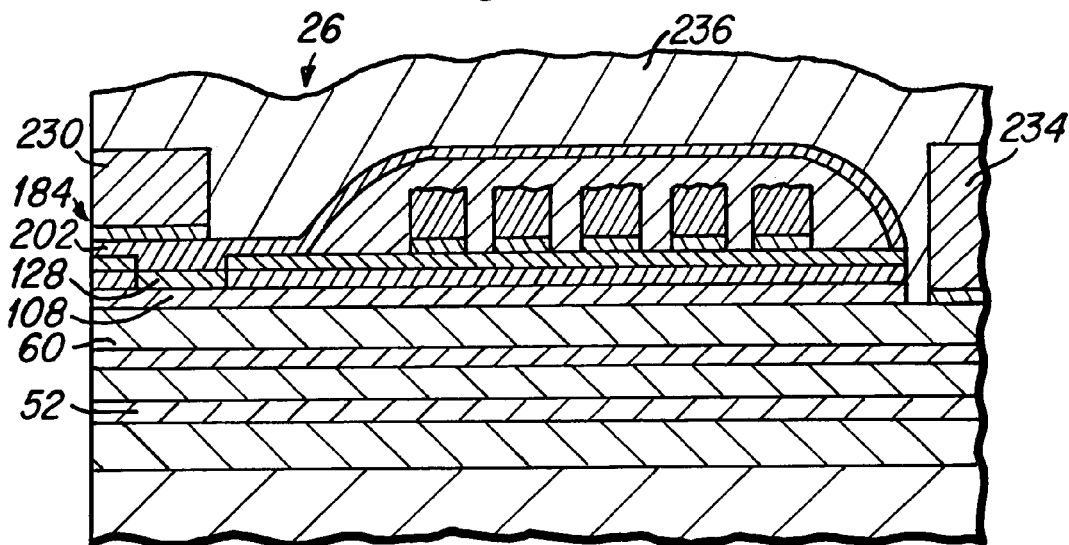
Figure 24:
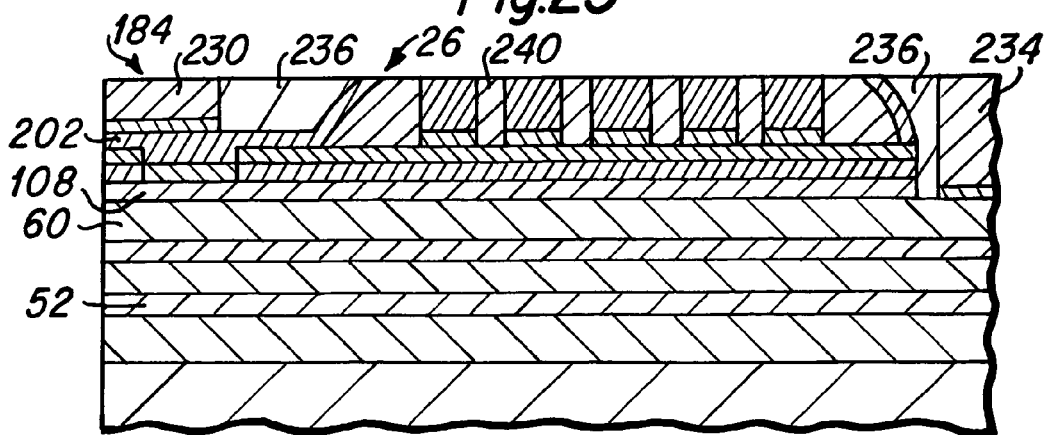
Figure 25:
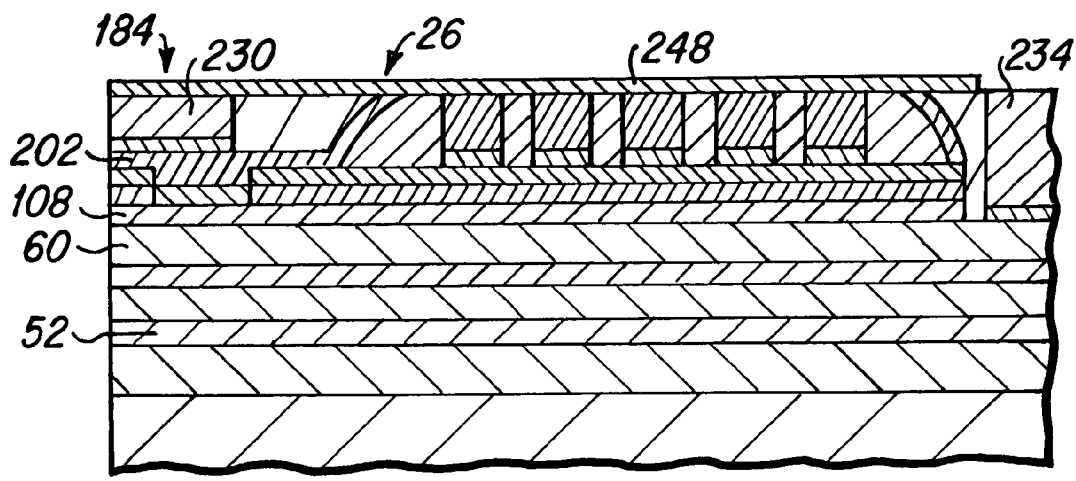

As is next depicted in FIG. 23, the resist layer 216 and seed layer 212 are removed, and a patterned hard bake resist 236 is fabricated over the induction coil area. A CMP step is next undertaken, as depicted in FIG. 24, to obtain a flat upper surface 240 to the wafer for further processing steps. Following the CMP step, as depicted in FIG. 25, a write gap layer 248 is deposited across the flat surface of the wafer, followed by pattern etching step to remove the write gap layer 248 at the location of the back gap 234.

Figure 26:
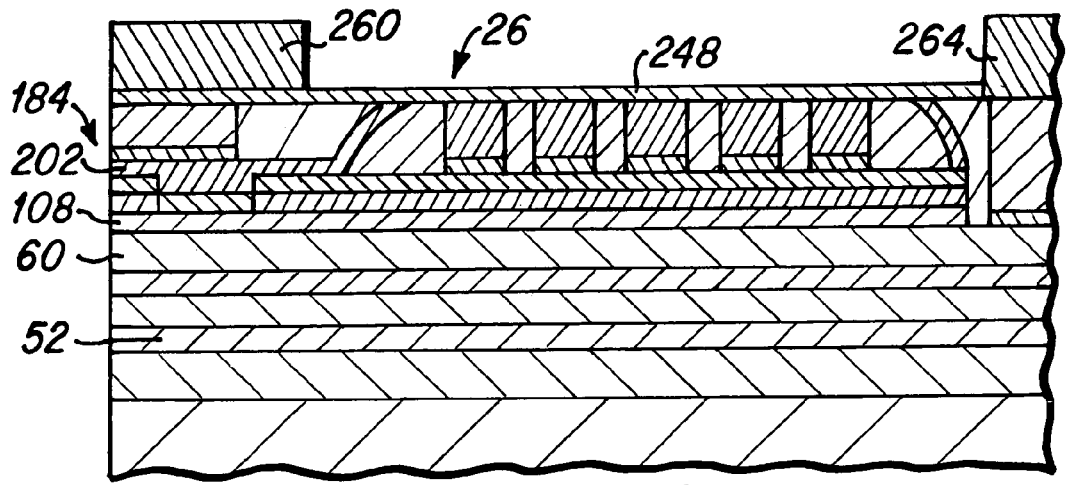
Figure 27:
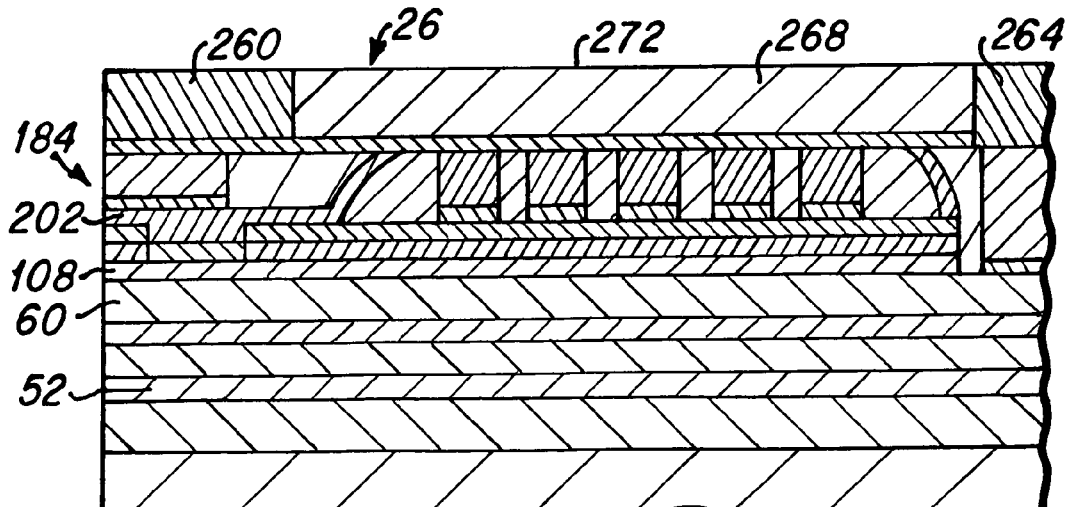
Figure 28:
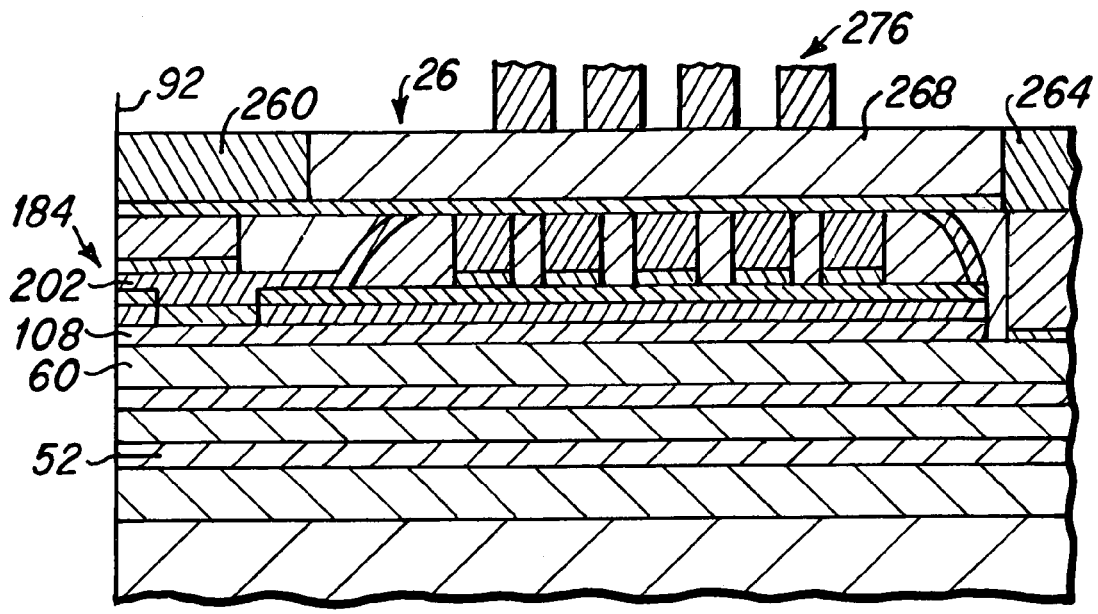
Figure 29:
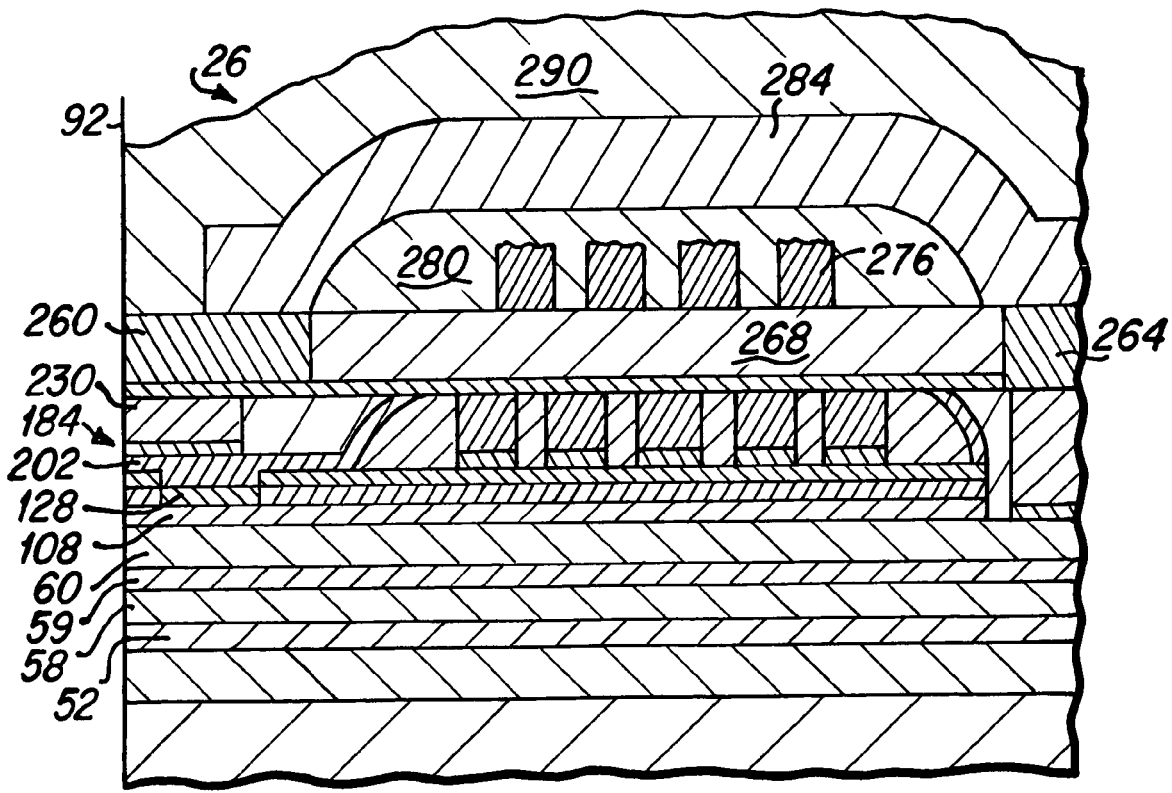

As is next depicted in FIG. 26, following the deposition of the write gap layer 248, utilizing photolithographic techniques, a P2 pole tip member 260 and a back gap member 264 are fabricated. Thereafter, as depicted in FIG. 27, an alumina layer 268 is deposited across the wafer, followed by a CMP step to achieve a flat surface 272. Thereafter, as depicted in FIG. 28, an optional second layer of induction coils 276 is fabricated upon the alumina layer 268 utilizing photolithographic techniques such as were used to fabricate the first induction coil layer 194. Thereafter, as depicted in FIG. 29, the second induction coil layer 276 is encapsulated in a hard bake resist 280 and a magnetic pole yoke member 284 is subsequently electroplated above the hard baked resist 280 to magnetically interconnect the P2 tip pole 260 and the back gap 264. The P2 pole tip 26,0 and back gap 264 will typically be a high magnetic moment material such as NiFe or CoFe. The yoke material 284 will typically be a lower moment material to allow fast switching of the head, such as Permalloy or NiFe 45/55. Following the fabrication of the second magnetic pole yoke 284, further fabrication steps as are well known to those skilled in the art are conducted, and the magnetic head 26 is finally encapsulated with an insulation layer 290 such as alumina with electrical connections (not shown) for external connections to be made.

As has been indicated hereabove, although the magnetic head 26 of the preferred embodiment of the present invention has been described in detail to include a piggyback magnetic head and a two layer induction coil, it is to be understood that the heating device 184 of the present invention that is disposed beneath a P1 pole pedestal, can be incorporated into merged magnetic heads, and magnetic heads having differing induction coil designs and differing P2 magnetic pole designs.

It is preferable to keep the heating device 184 away from the air bearing surface (ABS) by having some alumina insulator between the heating device and the ABS to prevent electrostatic discharge between the heating device and the magnetic media across the air bearing gap between the head and the media surface. It is to be noted that due to the direction of the disk surface relative to the magnetic head, that the heating device disposed beneath the P1 pedestal will heat the media prior to the media crossing the write gap where the data bits are written. Also, while the heating device adds a second gap in the magnetic pole circuits, due to the relatively large area of the P1 pole footprint, the added gap increases the reluctance of the magnetic poles less than 10%. Therefore, the use of the heating device does not affect the functional characteristics of the write head significantly. Nevertheless, the gap caused by the heating device should be as thin as possible to produce minimal reluctance increase in the magnetic circuit. Additionally, in electrically connecting the heating device, one or two more leads to the head 26 will be needed. The head may be fabricated such that the heating device may share one lead with one of the existing electrical connection pads. Lastly, it is important that the materials forming the heating device are compatible with existing fabrication materials of the head.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

What is claimed is:

1. A magnetic head, comprising:
a first magnetic pole layer;
a first electrical insulation layer being disposed upon said first magnetic pole layer;
a second electrical insulation layer being disposed upon said first insulation layer;
a heating device being disposed upon said first electrical insulation layer and within said second electrical insulation layer, said heating device being disposed above said first magnetic pole layer;
a third electrical insulation layer being disposed upon said second electrical insulation layer, where said third electrical insulation layer is not disposed upon an upper surface of said heating device;
a fourth electrical insulation layer being disposed upon said upper surface of said heating device and upon said third electrical insulation layer;
a first magnetic pole pedestal member being disposed above said heating device, such that said heating device is disposed between said first magnetic pole layer and said first magnetic pole pedestal.

2. A magnetic head as described in claim 1 wherein said heating device includes an electrically resistive heating element.

3. A magnetic head as described in claim 2 wherein said heating device includes a pair of electrical leads, and wherein said electrically resistive heating element is disposed directly beneath said leads.

4. A magnetic head as described in claim 3 wherein said electrically resistive heating element includes an outer edge, and each of said electrical leads includes an outer edge, and wherein said outer edge of said electrically resistive heating element and said outer edges of said electrical leads are aligned in a plane.

5. A magnetic head as described in claim 2 wherein said electrically resistive heating element is a layer of electrically conductive material having a thickness of approximately 400 Å, and having a track width of approximately 2 microns and a stripe height of approximately 0.5 microns.

6. A magnetic head as described in claim 5 wherein said electrically resistive heating element is comprised of NiCr or NiFe.

7. A magnetic head as described in claim 5 wherein the magnetic head includes an air bearing surface, and wherein said heating device is disposed away from said air bearing surface, and wherein a portion of said second electrical insulation layer is disposed between said heating device and said air bearing surface.

8. A magnetic head as described in claim 1 wherein said first electrical insulation layer is thicker than said fourth electrical insulation layer.

9. A magnetic head as described in claim 8 wherein said first electrical insulation layer is approximately 1,000 Å thick, and said fourth electrical insulation layer is approximately 250 Å thick.

10. A hard disk drive including a magnetic head, comprising:
   a read head element;
   a write head element, including;
   a first magnetic pole layer;
   a first electrical insulation layer being disposed upon said first magnetic pole layer;
   a second electrical insulation layer being disposed upon said first insulation layer;
   a heating device being disposed upon said first electrical insulation layer and within said second electrical insulation layer, said heating device being disposed above said first magnetic pole layer;
   a third electrical insulation layer being disposed upon said second electrical insulation layer, where said third electrical insulation layer is not disposed upon an upper surface of said heating device;
   a fourth electrical insulation layer being disposed upon said upper surface of said heating device and upon said third electrical insulation layer;
   a first magnetic pole pedestal member being disposed above said heating device, such that said heating device is disposed between said first magnetic pole layer and said first magnetic pole pedestal.

11. A hard disk drive as described in claim 10 wherein the magnetic head includes an air bearing surface, and wherein said heating device is disposed away from said air bearing surface, and wherein a portion of said second electrical insulation layer is disposed between said heating device and said air bearing surface.

12. A hard disk drive as described in claim 10 wherein said heating device includes an electrically resistive heating element.

13. A hard disk drive as described in claim 12 wherein said electrically resistive heating element is a layer of electrically conductive material having a thickness of approximately 400 Å, and having a track width of approximately 2 microns and a stripe height of approximately 0.5 microns.

14. A hard disk drive as described in claim 13 wherein said electrically resistive heating element is comprised of NiCr or NiFe.

15. A hard disk drive as described in claim 10 wherein said first electrical insulation layer is thicker than said fourth electrical insulation layer.

16. A hard disk drive as described in claim 15 wherein said first electrical insulation layer is approximately 1,000 Å thick, and said fourth electrical insulation layer is approximately 250 Å thick.

* * * * *